United States Patent [19]

Weil et al.

[11] Patent Number: 4,741,468

[45] Date of Patent: May 3, 1988

[54] APPARATUS FOR CONVEYING ROUNDED BODY BLANKS THROUGH A WELDING ZONE

[75] Inventors: Wolfgang Weil, Heitersheim, Fed. Rep. of Germany; Michael Baumgartner, Rudolfstetten; Andreas Lanz, Bergdietikon, both of Switzerland

[73] Assignee: Elpatronic AG, Switzerland

[21] Appl. No.: 39,674

[22] Filed: Apr. 16, 1987

[30] Foreign Application Priority Data

Apr. 22, 1986 [CH] Switzerland .................. 1628/86

[51] Int. Cl.⁴ .................................. B23K 37/04
[52] U.S. Cl. .......................... 228/16; 228/17.5; 228/44.3; 228/47; 219/64; 219/79
[58] Field of Search ............... 228/16, 17.5, 44.3, 228/47, 146, 151, 173.6; 219/64, 79; 72/284, 306, 367

[56] References Cited

U.S. PATENT DOCUMENTS

| | | | |
|---|---|---|---|
| 1,124,759 | 1/1915 | Lloyd | 228/16 |
| 2,322,221 | 6/1943 | Cereghino | 219/64 |
| 2,517,574 | 8/1950 | Jones et al. | 219/64 |
| 2,767,829 | 10/1956 | Hallden | 72/284 |
| 3,591,756 | 7/1971 | Timko | 219/64 |
| 4,352,001 | 9/1982 | Ishibashi | 219/64 |
| 4,354,090 | 10/1982 | Nilsen | 228/17.5 |
| 4,417,117 | 11/1983 | Opprecht | 198/461 |

FOREIGN PATENT DOCUMENTS

| | | | |
|---|---|---|---|
| 2016559 | 12/1970 | Fed. Rep. of Germany | 72/284 |
| 2907391 | 9/1980 | Fed. Rep. of Germany | 228/17.5 |

OTHER PUBLICATIONS

Machinery's Handbook, 21st Edition, p. 2381, 1979.

Primary Examiner—Nicholas P. Godici
Assistant Examiner—Samuel M. Heinrich
Attorney, Agent, or Firm—McCormick, Paulding & Huber

[57] ABSTRACT

On a machine for welding the longitudinal edges (12,14) of rounded body blanks (10), two groups of movable guide elements (36), which exert radial guiding forces on the blanks (10), are arranged lying opposite one another with respect to the blanks. The guide elements (36) of each of the two groups are secured to an endless chain (38). Each of these chains (38) has a chain strand extending in the direction of movement (axis A) of the blanks (10), which strand is supported by a rail (52) at both sides of a welding plane (B) containing the welding zone and normal to the direction of movement of the blanks (10). The guide elements (36) move through the welding plane (B) with the blanks (10). As a result, shock-like actions on the blanks (10) in the vicinity of the welding plane (B) are avoided; consequently, the longitudinal edges (12,14) can be welded together particularly evenly, particularly by means of a laser beam.

6 Claims, 6 Drawing Sheets

APPARATUS FOR CONVEYING ROUNDED BODY BLANKS THROUGH A WELDING ZONE

The invention relates to an apparatus for conveying rounded body blanks through a welding zone of a machine for welding the longitudinal edges of the blanks, having groups of movable guide elements which are situated opposite one another with respect to the blanks and exert radial guiding forces on these.

In known apparatuses of this type (DE-PS No. 25 59 671), diabolo-like or concavely curved rollers are arranged, as guide elements, all round the axis along which the blanks are moving. Some of these rollers are resiliently supported radially in such a manner that they exert forces on the blanks which tend to urge their longitudinal edges towards a stationary guide rail of Z-shaped section. Such guide elements, which are movable only in a radial direction and each of which is rotatable about its own axis, fulfil their purpose satisfactorily if the blanks which are being conveyed through the welding zone have a diameter of the order of magnitude of 50 mm or more, particularly if the longitudinal edges of the blanks are being welded in an overlapped mash seam. Difficulties can arise with known apparatuses of the type described, however, if the diameter of the blanks is smaller than 50 mm and/or the longitudinal edges of the blanks are being butt-welded together, particularly by means of a laser beam. In such cases, the quality of the welding seam can be reduced by scarcely noticeable jolts which occur whenever one of the numerous guide elements in the form of rollers provided in or near the welding zone rolls first over the front end and later over the rear end of a blank.

It is therefore the object of the invention to design an apparatus for conveying rounded body blanks through a welding zone in such a manner that it is also suitable for blanks of small diameter, for example 32 or 25 mm, and in particular for the laser welding of the longitudinal edges of such blanks. Bodies of such a small diameter are needed primarily for electric batteries.

In apparatus of the type described at the beginning, the problem is solved, according to the invention, in that the guide elements of each group are disposed on an endless chain which comprises a chain strand extending in the direction of movement of the blanks and supported at both sides of a plane, the welding plane, containing the welding zone and normal to the direction of movement of the blanks, by a rail.

It is true that a conveying installation for can bodies in resistance welding machines is known (DE-OS No. 28 20 188) wherein two chains provided with dog-like pushers are arranged one behind the other, of which one chain travels through a station for rounding body blanks in which is intermittently at least approximately stands still during the rounding of the body blank, while the second chain follows on the first chain and takes over the rounded blanks from this in order to move them to the welding zone. The second chain ends at a distance from the welding plane, however; it does not guide the rounded blanks but only pushes them forwards until they are caught by two electrode rollers and conveyed further by these. In order to convey the blanks through the welding plane, sizing tools are provided which are independent of the chains and which act on the blanks with diabolo-like rollers as described above and do not participate in their conveying movement.

In contrast, the effect is achieved by the invention that while the guide elements are exerting the necessary radial guiding forces on the body blanks, they move jointly with these through the welding plane and at the same time are supported on the associated rail at both sides of the welding plane, that is to say upstream ad downstream thereof in the conveying direction. As a result, shock-like actions on the blanks in the vicinity of the welding plane are avoided; consequently, the longitudinal edges of the blanks move smoothly and uniformly through the welding zone.

Each of the rails preferably extends without interruption and in a straight line between a beginning and an end, the distance of which from the welding plane is greater than the length of each individual blank.

It is a further advantage if the guide elements are each secured to two link pins of the associated chain.

In addition, it is useful if the guide elements each have a cylindrical contact surface for the blanks.

The chains are preferably constructed in the form of roller chains and bear against the associated rail through their rollers.

It is conceivable for the blanks to be conveyed through the welding plane in known manner, for example by means of reciprocating pusher dogs or to be conveyed only as far as the welding plane and then moved further by electrode rollers. In such cases, if the guiding and return of the chains is substantially free of friction, it is possible in principle for the chains to be without their own drive and to be simply entrained by the blanks.

In a preferred form of the invention, however, each of the chains passes round a drive wheel through which it can be driven.

This preferred form of the invention may appropriately be further developed in that at least one of the chains can be swung, together with the associated rail and a chain tension wheel, round the associated drive wheel away from the opposite chain. In this manner, the apparatus according to the invention can easily be opened for maintenance and to eliminate faults.

It is a further advantage, if each of the rails is supported radially on two springs which are offset in relation to one another in the conveying direction and adjustable independently of one another. With this possibility of adjustment, it can be achieved, in a particularly simple manner, that the longitudinal edges of the blanks have a precisely predetermined position in relation to one another in the welding zone, that is to say either overlap by a specific amount if a lap weld seam is to be produced or the longitudinal edges abut against one another if a butt-weld seam is to be formed, particularly with a laser beam.

A slide rail, particularly a rail with a Z-shaped section usually called a Z-rail, guiding the longitudinal edges of the blanks may be provided, as usual, in a central longitudinal plane of the apparatus according to the invention. In this case, it is an advantage if, in accordance with a further feature of the invention, a magnetic rail additionally guiding the blanks is provided diametrically opposite the slide rail.

Finally, it is an advantage if a guide sleeve, which becomes narrower in the form of a funnel in the direction of movement of the blanks and comprises at least one axial slit along which a dog can be moved to push the blanks in between the chains, is provided upstream of the chains in the direction of conveying.

One example of embodiment of the invention is explained with further details below, with reference to diagrammatic drawings.

Figure 1:
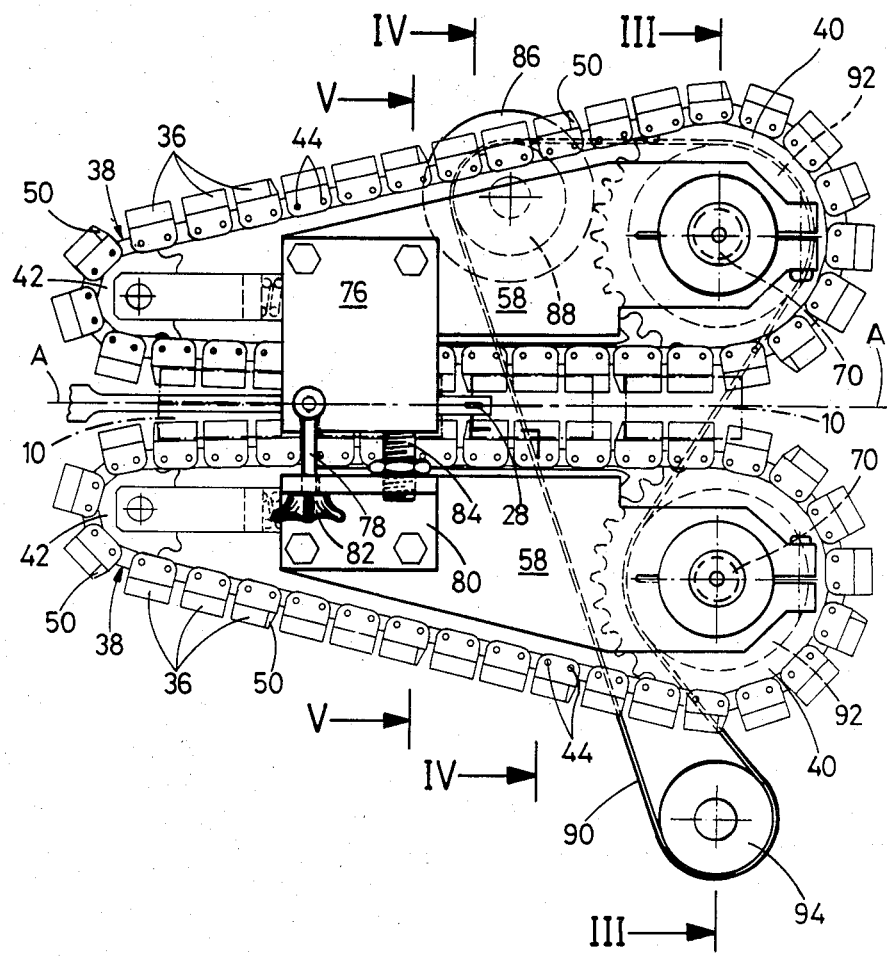
FIG. 1 shows an apparatus according to the invention in plan view.
Figure 2:
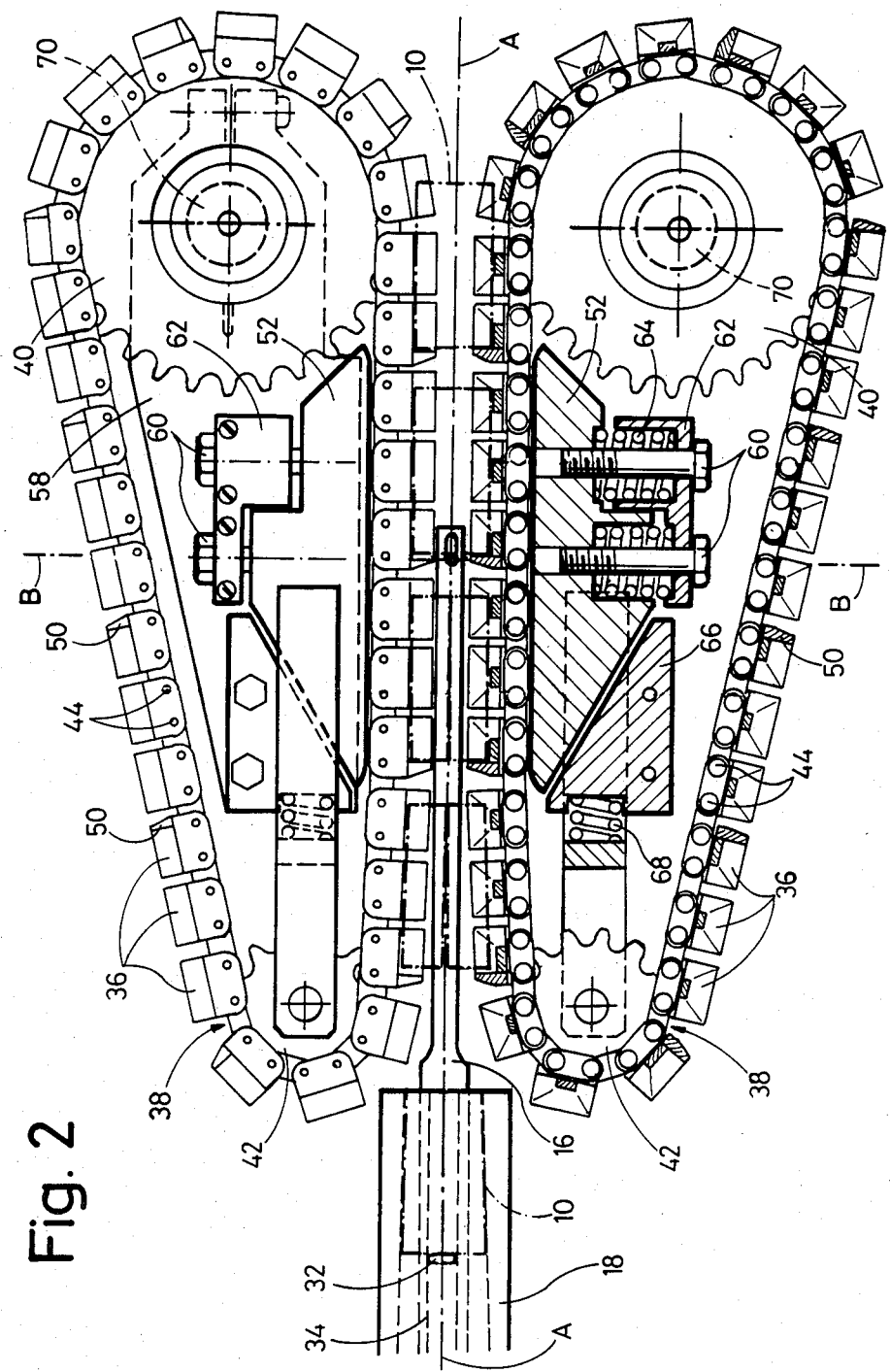
FIG. 2 shows the same apparatus in the partially dismounted state and partly in horizontal section.
Figure 3:
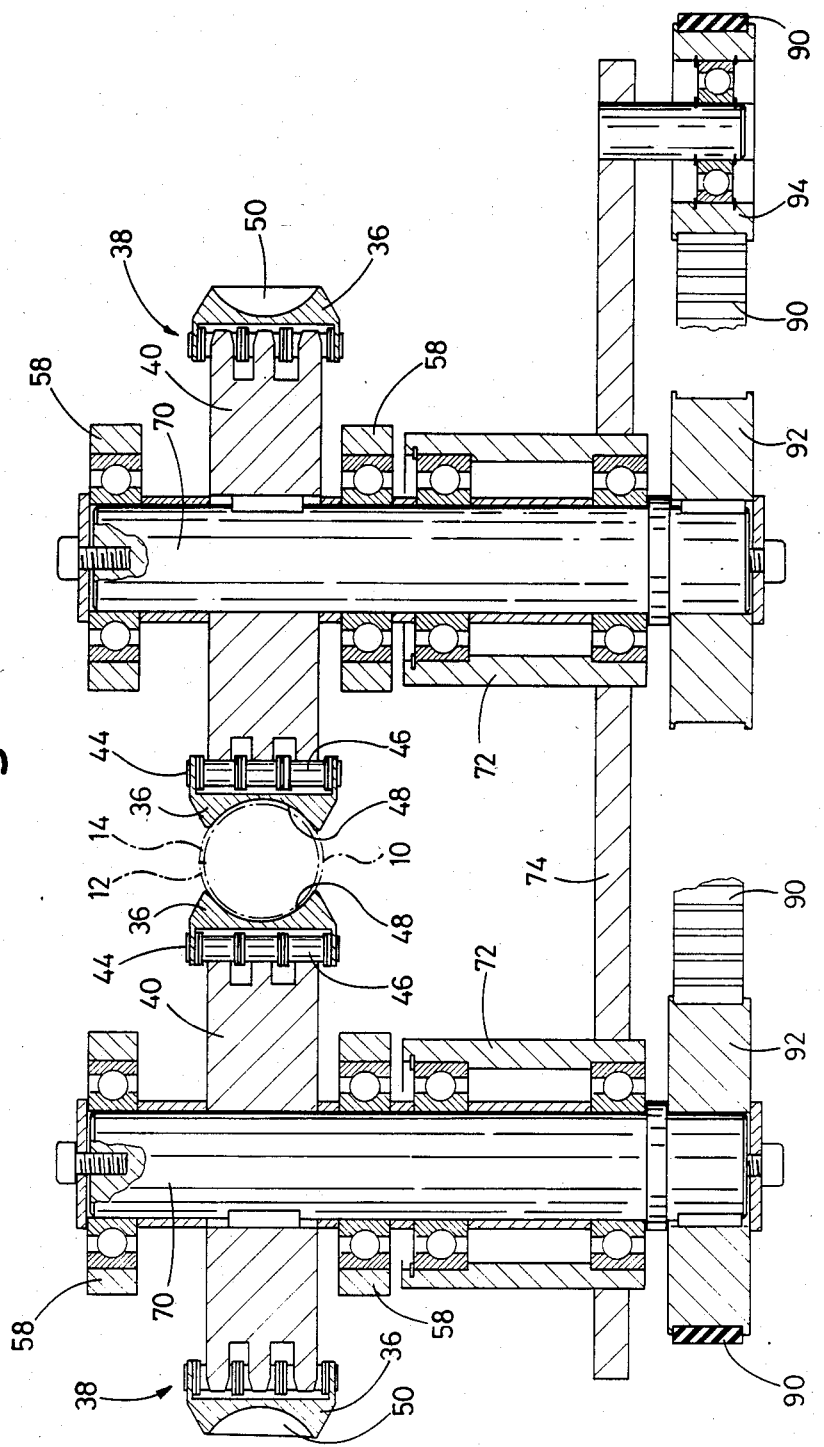
FIG. 3 shows the section in the vertical plane III—III in FIG. 1.

The purpose of the apparatus illustrated is to guide body blanks 10, which are rounded cylindrically about an axis A and consist, for example of uncoated sheet steel or of tin plate, in such a manner that their longitudinal edges 12 and 14, lying firmly against one another, can be welded together while the blanks 10 are being moved forwards, along their axis A, from left to right in FIGS. 1 and 2, through a welding plane B normal to the axis A. Such welded housings are provided, in particular, as housings for electric batteries.

Figure 4:
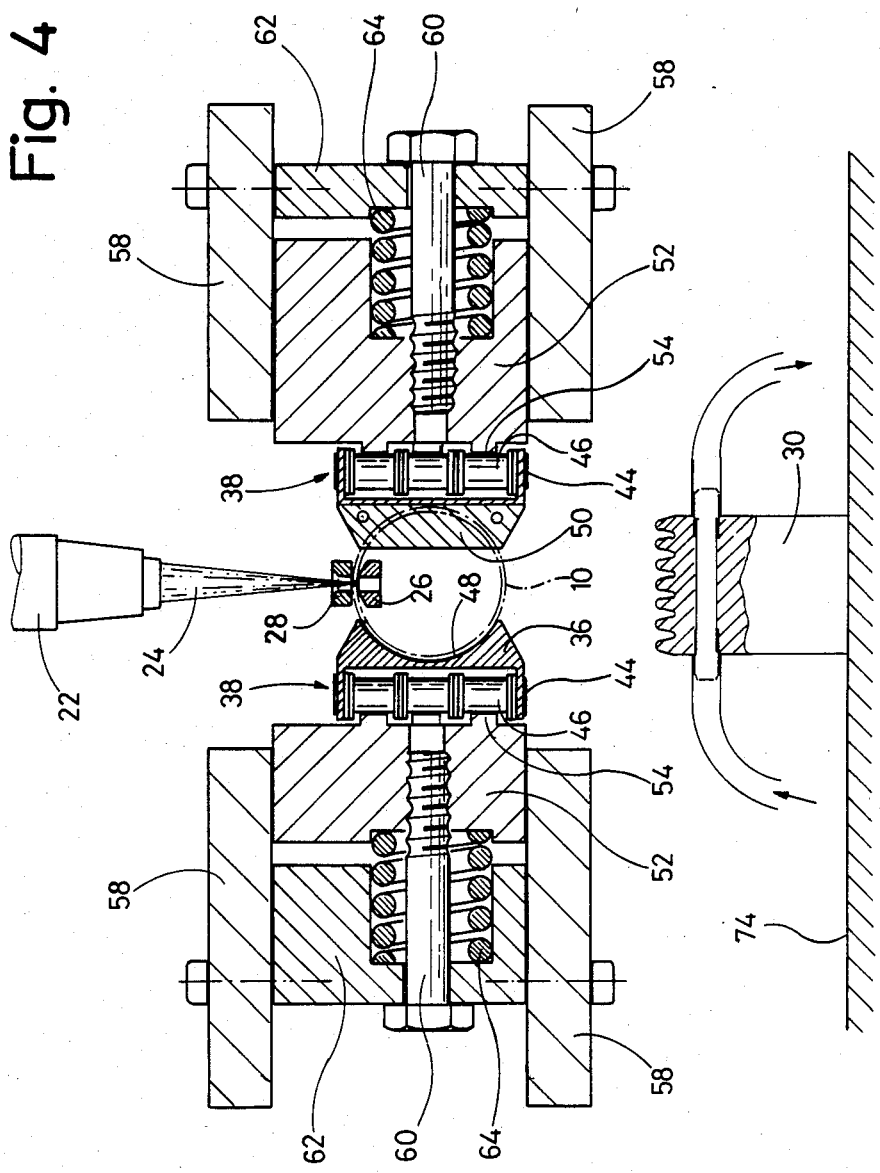
FIG. 4 shows the section in the vertical plane IV—IV in FIG. 1.
Figure 5:
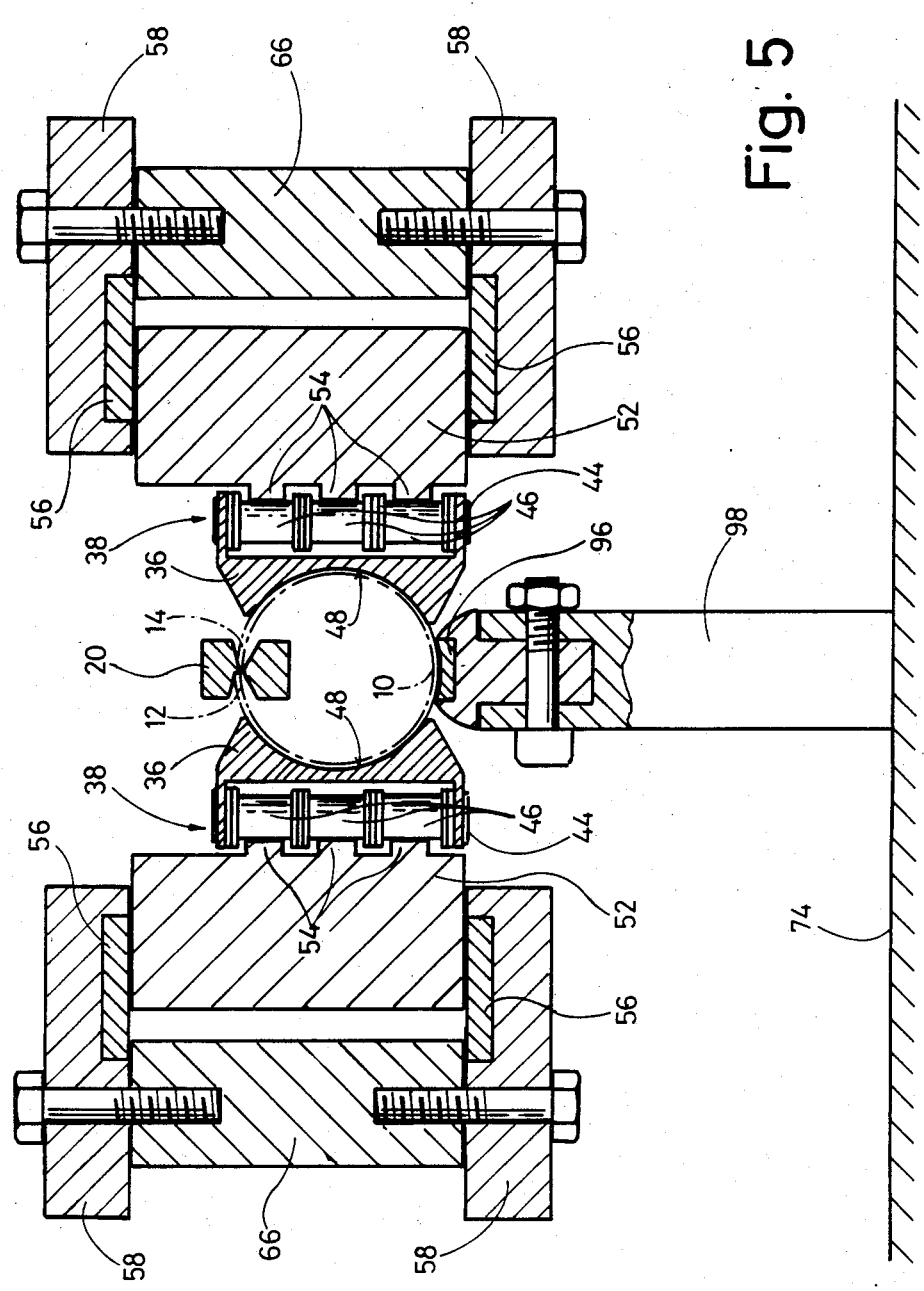
FIG. 5 shows the section in the vertical plane V—V in FIG. 1

Before the blanks 10 reach the apparatus illustrated, they have been rolled by a rounding device of conventional construction round a stationary lower arm 16 which extends parallel to the axis A, which is horizontal in the usual manner, through a guide sleeve 18 which is likewise stationary, the arm projecting centrally into the apparatus illustrated. Secured to the lower arm 16, downstream of the guide sleeve 18 in the conveying direction of the blanks 10, is a likewise usual slide rail 20 of Z-shaped section on which the longitudinal edges 12 and 14 of the blanks are guided. The slide rail 20 ends shortly before the welding plane B in which there is a laser gun 22, the beam 24 of which is indicated in FIG. 4. In the region of the beam 24, the longitudinal edges 12 and 14 run between a front end portion 26 of the lower arm 16 and a pressure pad 28 provided above this, both of which are perforated in such a manner that they do not hinder the beam 24. A cooled absorber 30 is disposed vertically below.

Provided to push the blanks 10 through the guide sleeve 18 is a dog 32 which can be reciprocated parallel to the axis A by means of a conventional drive device, not illustrated, for example of the crank mechanism type, and which projects, during its forward movement, through an axial slit 34 in the guide sleeve 18 into the interior thereof. Each blank 10 which emerges from the guide sleeve 18 is grasped by two groups of guide elements 36, each of which is mounted on an endless chain 38.

When the apparatus is in the operating position, the two chains 38 are arranged symmetrically with respect to the axis A, they each have a chain strand travelling forwards parallel to this, and they extend in a horizontal plane round a drive wheel 40 and a chain tension wheel 42 in each case. From the chain tension wheels 42, the chains 38 converge towards their chain strands with parallel axes.

In the example illustrated, both chains 38 are constructed in the form of triple roller chains; their links are connected to one another by link pins 44 on each of which three rollers 46 are mounted. Each of the guide elements 36 is secured to two adjacent link pins 44 and has a cylindrical contact surface 48, the diameter of which coincides with the external diameter of the blanks 10.

With the length of blank illustrated, each of the blanks 10 is grasped at its two sides by three guide elements 36 in each case and conveyed along the axis A through the welding plane B. A pusher dog 50 is secured to the last of each group of three guide elements 36. The pusher dogs 50 on the two chain strands with parallel axes are situated opposite one another in pairs so that each blank 10 is grasped by a pair of pusher dogs 50 which bears against its rear end and is thus then moved reliably through the welding plane B even if the radial forces with which the guide elements 36 act on the blanks 10 through their contact surfaces 48 should be too weak to produce sufficient frictional forces for the entrainment of the blanks.

The magnitude of the said radial forces is determined by the fact that the straight chain strand of each of the two chains 38 is supported on a rail 52. Each of the rails 52 has three guide ribs 54 which are arranged one above the other parallel to the axis A and on which the rollers 46 of the associated chain 38 run. The length of the guide ribs 54 in front of and behind the welding plane B is greater than the length of the blanks; consequently, each blank 10 is guided without jolting, through the guide elements 36 accompanying it, from the movement before the front end of the blank reaches the welding plane B until a moment after its rear end has left the welding plane.

Each of the two rails 52 is guided for displacement between two slide plates 56 each of which is secured to a side wall 58. Screwed into each of the rails 52 are two threaded bolts 60 which extend in a horizontal plane radially in relation to the axis A and are guided in a support 62 which is secured between the two associated side walls 58. Gripped between each of the two rails 52 and the associated support 62 are two compression springs 64 each of which is arranged round one of the threaded bolts 60 and which support the rail with a supporting force of the order of magnitude of 25 to 30 kg for example. In this way, the chain strand of each of the two chains 38 that is parallel to the axis is supported for adjustment, in a radial direction with respect to the axis A, by the associated rail 52.

A further support 66 is secured to each of the associated side walls 58 in the vicinity of the rails 52 and on it the associated chain tension wheel 42 is guided displaceably and likewise supported through a compression spring 68.

Each of the two drive wheels 40 is secured to a vertical shaft 70 each of which is mounted in a bush 72. The two bushes 72 are secured to a common, stationary base plate 74. The two pairs of associated side walls 58 are each mounted on one of the two shafts 70 so that they can be swung about the associated shaft out of their operating position illustrated in FIGS. 1 to 5 into a maintenance position.

Figure 6:
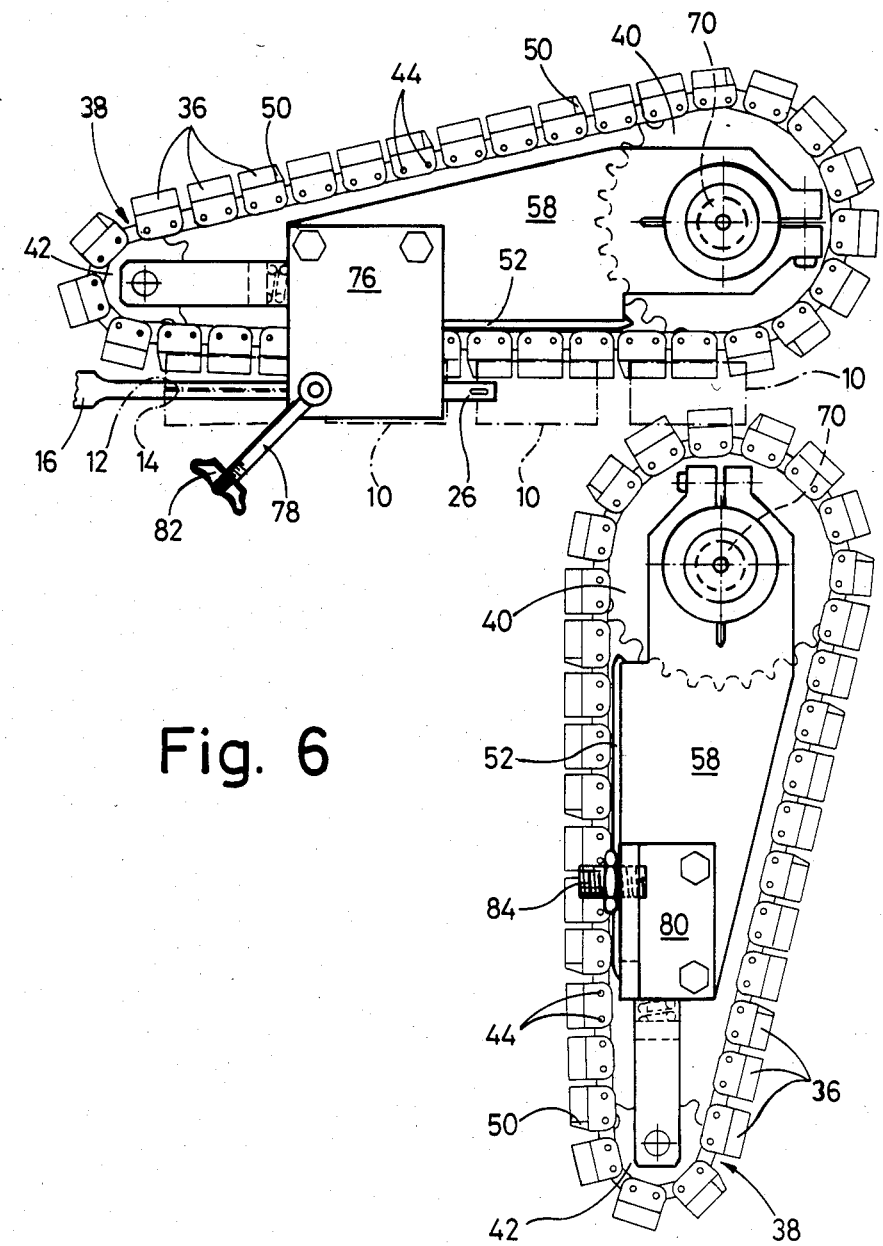
FIG. 6 shows the apparatus in a plan view corresponding to FIG. 1 but in the opened state.

In FIG. 6, a pair of side walls 58 together with associated parts of the apparatus, particularly chain 38 together with guide elements 36 and chain tension wheel 42, has been swung into the maintenance position while the other pair of side walls 58 together with associated parts of the apparatus still occupies its operating position. Secured to the upper side wall 58 of one of the two pairs of side walls is a lock plate 76 on which a tie bar 78 is pivotally mounted. Secured to the upper side wall 58 of the other pair of side walls in a corresponding manner is a lock plate 80 which, in the operating position of the apparatus, can be clamped to the lock plate 76 by means of the tie bar 78 and a screw handle 82 screwed onto this. The spacing apart which is maintained by the chain strands, parallel to the axis, of the two chains 38 in the operating position is determined by an adjustable stop screw 84 which is screwed into the lock plate 80 and strikes with one of its end faces against the lock plate 76.

The two shafts 70 can be driven in opposite directions at precisely the same speed; for this purpose, a controllable electric motor 86 is connected, through a pinion 88 and a toothed belt 90, to two gear wheels 92 each of which is secured to one of the shafts 70. The toothed belt 90 is additionally wrapped round a guide wheel 94 which is mounted on the base plate 74.

The drawings illustrate how four blanks 10 travel through the apparatus described above with fixed spacing, being guided by the guide elements 36 on the chain strands parallel to the axis. In the welding zone, the longitudinal edges 12 and 14 are welded together by the beam 24. The fully welded blanks 10 are then conveyed further between the chain strands parallel to the axis and finally delivered at a comparatively great distance from the welding plane B, for example to a further processing apparatus.

In order to improve the guiding of the blanks 10 still further, a magnetic rail 96 is secured to supports 98 below the slide rail 20. The blanks 10 slide on the magnetic rail 96 in a region situated diametrically opposite to their longitudinal edges 12 and 14, before and while they are grasped by the guide elements 36. As a result, assurance is provided that the blanks 10 assume precisely a predetermined position in relation to the guide elements 36. The magnetic strength is selected so that the frictional force between each blank 10 and the magnetic rail 96 coincides at least approximately with the sum of the frictional forces between the longitudinal edges 12 and 14 and the slide rail 20. As a result, the moments of these frictional forces are at least substantially in equilibrium and therefore cannot tilt the blank 10.

We claim:

1. An apparatus for conveying rounded body blanks (10) through a welding zone for a machine for welding the longitudinal edges (12,14) of the blanks (10), having groups of movable guide elements (36) which are situated opposite one another with respect to the blanks (10) and exert radial guiding forces on these, characterized in that the guide elements (36) of each group are disposed on an endless chain (30) which comprises a chain strand extending in the direction of movement (axis A) of the blanks (10) and supported at both sides of a welding plane B containing the welding zone and normal to the direction of movement of the blanks (10), by rails (52) each of which extends without interruption and in a straight line between a beginning and an end, the distance of which from the welding plane B is greater than the length of each individual blank (10).

2. An apparatus as claimed in claim 1, characterised in that the guide elements (36) are each secured to two link pins (44) of the associated chain (38).

3. An apparatus for conveying rounded body blanks (10) through a welding zone of a machine for welding the longitudinal edges (12,14) of the blanks (10), having groups of movable guide elements (36) which are situated opposite one another with respect to the blanks (10) and exert axial guiding forces on these, characterized in that the guide elements (36) of each group are disposed on an endless chain (38) which comprises a chain strand extending in the direction of movement (axis A) of the blanks (10) and supported at both sides of a welding plane B containing the welding zone and normal to the direction of movement of the blanks (10), by rails (52) said chains (38) each wrapping around a drive wheel (40) with at least one of the chains (38) swingable, together with the associated rail (52) and a chain tension wheel (42), round the associated drive wheel (40) away from the opposite chain (38).

4. An apparatus as claimed in claim 3, characterised in that each of the rails (52) is radially supported on two springs (64) which are offset in relation to one another in the direction of movement of the blanks (10) and are adjustable independently of one another.

5. An apparatus for conveying rounded body blanks (10) through a welding zone of a machine for welding the longitudinal edges (12,14) of the blanks (10), having groups of movable guide elements (36) which are situated opposite one another with respect to the blanks (10) and exert radial guiding forces on these, characterized in that the guide elements (36) of each group are disposed on an endless chain (38) which comprises a chain strand extending in the direction of movement (axis A) of the blanks (10) and supported at both sides of a welding plane B containing the welding zone and normal to the direction of movement of the blanks (10), by rails (52) and having a slide rail (20) guiding the longitudinal edges (12,14) of the blanks (10), characterized in that the slide rail (20) is situated diametrically opposite a magnetic rail (96) additionally guiding the blanks (10).

6. An apparatus as claimed in claim 5, characterised in that upstream of the chains (38) in the conveying direction, a guide sleeve (18) is provided which narrows in the form of a funnel in the direction of movement of the blanks (10) and has at least one axial slit (34) along which a dog (32) can be moved to push the blanks (10) in between the chains (38).

* * * * *